(12) United States Patent
Shikazono et al.

(10) Patent No.: US 6,472,838 B1
(45) Date of Patent: Oct. 29, 2002

(54) ROBOT CONTROLLER AND CONTROL METHOD

(75) Inventors: Makoto Shikazono, Osaka (JP); Akio Shindo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/529,834

(22) PCT Filed: Aug. 18, 1999

(86) PCT No.: PCT/JP99/04426

§ 371 (c)(1),
(2), (4) Date: Jun. 15, 2000

(87) PCT Pub. No.: WO00/11526

PCT Pub. Date: Mar. 2, 2000

(30) Foreign Application Priority Data

Aug. 21, 1998 (JP) .......................................... 10-235281

(51) Int. Cl.[7] .............................................. G05B 19/10
(52) U.S. Cl. ................. 318/567; 318/560; 318/568.11; 318/568.12; 318/568.13; 318/568.1; 318/568.2; 318/568.21
(58) Field of Search ................................. 318/560–696; 901/3, 7, 13–21; 395/80, 81, 86, 85, 89; 700/245, 63, 258

(56) References Cited

U.S. PATENT DOCUMENTS

| 3,909,600 | A | * | 9/1975 | Hohn | |
|---|---|---|---|---|---|
| 4,178,632 | A | * | 12/1979 | Anthony | 318/568.14 |
| 4,432,063 | A | * | 2/1984 | Resnick | 318/568.13 |
| 4,433,382 | A | * | 2/1984 | Cunningham et al. | |
| 4,600,869 | A | * | 7/1986 | Sekine et al. | 318/568.13 |
| 4,941,106 | A | * | 7/1990 | Krieger | |
| 4,956,790 | A | * | 9/1990 | Tsuchihashi et al. | |
| 5,053,975 | A | * | 10/1991 | Tsuchihashi et al. | |
| 5,079,491 | A | * | 1/1992 | Nose et al. | 318/567 |
| 5,086,400 | A | * | 2/1992 | Hayati et al. | |
| 5,204,598 | A | * | 4/1993 | Torii et al. | 318/563 |
| 5,565,854 | A | * | 10/1996 | Kataoka et al. | 345/156 |
| 5,760,560 | A | * | 6/1998 | Ohya et al. | |
| 5,949,683 | A | * | 9/1999 | Akami et al. | |
| 6,208,104 | B1 | * | 3/2001 | Onoue et al. | |
| 6,212,443 | B1 | * | 4/2001 | Nagata et al. | |

FOREIGN PATENT DOCUMENTS

| JP | 56-37103 | | 4/1981 |
|---|---|---|---|
| JP | 56-123014 | | 9/1981 |
| JP | 60-239803 | | 11/1985 |
| JP | 02-2704 | | 1/1990 |
| JP | 02-138303 | | 11/1990 |
| JP | 6-1-2925 | * | 4/1994 |
| JP | 07-191718 | | 7/1995 |
| JP | 07-311613 | | 11/1995 |
| JP | 08-115106 | | 5/1996 |
| JP | 8-267381 | * | 10/1996 |
| JP | 09-160630 | | 6/1997 |
| JP | 09-171405 | | 6/1997 |
| JP | 10-15863 | * | 1/1998 |
| JP | 10-315172 | * | 12/1998 |

* cited by examiner

Primary Examiner—Rita Leykin
(74) Attorney, Agent, or Firm—RatnerPrestia

(57) ABSTRACT

It is an object to provide a robot control system and a method of controlling the same having an outstanding extensibility, maintainability, and reliability in the system. A main control unit 1 and an auxiliary control unit 2 control a manipulator 4 actuated by a servo motor. The main control unit 1 and the auxiliary control unit 2 are so composed as to make a data communication via communication means 5. In addition, the main control unit 1 is connected to a centralized control unit 3 through communication means 7. The centralized control unit 3 supervises and controls concentrically a plurality of robot control apparatuses connected thereto.

13 Claims, 4 Drawing Sheets

ROBOT CONTROLLER AND CONTROL METHOD

THIS APPLICATION IS A U.S. NATIONAL PHASE APPLICATION OF PCT INTERNATIONAL APPLICATION PCT/JP99/04426.

FIELD OF THE INVENTION

The present invention relates to a robot control apparatus and its method for controlling a teaching, operation, and the like of an industrial robot. In particular, the invention relates to a robot control apparatus having an outstanding reliability and maintainability, and a great extensibility.

BACKGROUND OF THE INVENTION

FIG. 7 is a general architectural view of a robotic system of the prior art, and FIG. 8 is a block diagram of an exemplary structure of a robot control apparatus of the prior art. A manipulator 4 is controlled by a robot control apparatus 30, as shown in FIG. 7. The robot control apparatus 30 of the prior art comprises a main control circuit 301 for performing a centralized control of a robot, a servo controller circuit 302 for controlling a servo motor, and a servo amplifier 303 for driving the servo motor, all in one unit, as show in FIG. 8. The main control circuit 301 is composed of a processor (CPU) 301a, a random-access memory (RAM) 301b and a read-only memory (ROM) 301c. The CPU 301a performs various kinds of computations for control of the robot using a numerous data such as a teaching data, a coordinate system data, and the like of the robot stored in the RAM 301b, composed as a nonvolatile memory in a portion thereof, according to a system program stored in the ROM 301c. The main control circuit 301a and a servo controller circuit 302 are connected by a data bus 304, and an operating command from the main control circuit 301 is converted by the servo controller circuit 302 into a command for servo control, with which a servo amplifier 303 controls a servo motor 40 for operating each axle of a robot manipulator. An I/O interface 305 is connected to the data bus 300 for executing an I/O control of an external apparatus such as a robot hand and the like, not shown in the figure. Furthermore, a serial interface 306 is also connected to the data bus 300, and a teaching device for teaching a movement of the robot is connected to the serial interface 306.

Since such a robot control apparatus of the prior art has been composed as above, the main control circuit has been disposed in vicinity of the servo amplifier, which tends to generate heat and electric noise. Moreover, there is often such a case wherein the control apparatus itself is disposed in vicinity of the manipulator performing physical works, and used under an adverse environment of high temperatures and dusty particles, etc. Since there is a possibility for the main control circuit, which governs control of the robot, to cause a malfunction or to receive damages due to the foregoing internal and external factors, there requires appropriate measures to improve cooling, a noise immunity, dust-tightness, and so on in order to prevent them.

Furthermore, as the CPU in the main control circuit takes charge of various computations such as a locus generation, and calculation of an acceleration and deceleration of the robot, an operational performance of the robot depends upon a processing capacity of the CPU. Therefore, it is necessary to increase a capacity of the main control circuit, including this CPU, in order to improve a kinetic performance of the robot. However, a change of the CPU necessitates changes for a width of the bus, a transmission speed, a transmission mode, and so on of the data bus. In addition, it also requires modification of the servo controller circuit, the I/O interface, the serial port, etc. connected to the data bus.

Next, since the system program for the robot is stored in the ROM within the robot control apparatus, it is necessary to replace the ROM in order to renew the system program. However, if the robot control apparatus is installed at a high location, in a narrow space, or the like, a replacement of the ROM gives rise to a problem that it is difficult to ensure safety of a worker as the workability is extremely poor.

On the other hand, the teaching data, etc. of the robot are stored in the RAM composed of a nonvolatile memory. However, since the RAM needs to be kept energized with a battery and the like at all the time in order for it to maintain the stored data, it is necessary to back up this data to another memory device to prevent a loss of the data due to degradation and the like of the battery. Back up of the data can be accomplished by connecting the robot control apparatus to a personal computer via an interface such as a serial port, and then to an external recording device. However, a task required for the backup is complex, and it takes a long working hours, giving rise to another problem. Moreover, this task of backup also has a problem common to the afore-said replacement of the ROM that it is difficult to ensure safety of the worker, as the workability is extremely poor if the robot control apparatus is installed at a high location, in a narrow space, etc.

In addition, it is not easy to connect and use general purpose peripheral devices such as a display device like a monitor, etc., an input device like a keyboard, etc., and a telecommunications device like a network, etc. to the data bus and to the robot control apparatus, since architecture of the hardware such as the main control circuit and the data bus is of customizes composition. It is therefore necessary to prepare a separate custom-made interface individually for connecting the robot control apparatus to each of these devices, in order to use them. This presents still another problem that makes it difficult to expand the system freely, since there is a great deal of restriction to the kind of peripheral devices that can be connected and used with the robot control apparatus.

The present invention has been made to obviate the above-cited problems, and has an object to provide a robot control apparatus and a method thereof having a great extensibility and maintainability, as well as an outstanding reliability in its system.

SUMMARY OF THE INVENTION

A robot control apparatus of the present invention comprises a servo amplifier for controlling a driving source of a robot, an auxiliary control unit for outputting a driving control command to the servo amplifier, and a main control unit provided separately from the auxiliary control unit for outputting a control command for an operation of the robot to the auxiliary control unit through communication means. A method of controlling the robot comprises a step of generating a robot control command, and a step of outputting the control command for controlling the robot through the communication means, both performed in the main control unit. On the other hand, the auxiliary control unit takes a step of receiving the robot control command from the main control unit, a step of converting the command into another command to be transmitted to the servo amplifier, and a step of transmitting the converted command to the servo amplifier.

Also, the robot control apparatus of the present invention is provided with a nonvolatile data storage device and an external interface for connecting with a data bus in the main control unit.

Further, the robot control apparatus of the present invention is provided, also in the main control unit, with an auxiliary storage device for backup of data stored in the data storage unit of the main control unit.

In the robot control apparatus of the present invention, the main control unit transmits to the auxiliary control unit, a robot position control command calculated by the main control unit based on a teaching position data for the robot stored in the data storage device of the main control unit.

Furthermore, in the robot control apparatus of the present invention, a servo controller circuit performs an ON/OFF control of the servo amplifier based on an ON/OFF control signal for the servo amplifier transmitted from the main control unit to the auxiliary control unit. The method of controlling the robot in this process includes a step of outputting the ON/OFF control signal for the servo amplifier from the main control unit to the auxiliary control unit.

Moreover, in the robot control apparatus of the present invention, the servo controller circuit renders the servo amplifier to temporarily suspend and to restart its control based on a temporary suspension signal and a restart signal for the robot operation transmitted from the main control unit to the auxiliary control unit. The method of controlling the robot in this process includes a step of outputting the temporary suspension signal and the restart signal of the robot operation from the main control unit to the auxiliary control unit.

Also, the robot control apparatus of the present invention is provided with a timer means in the auxiliary control unit, and a robot suspension means for deactivating the servo amplifier, when a non-receiving time for the robot control command to be transmitted by the main control unit becomes equal to or longer than a pre-established period of time. The method of controlling the robot in this process includes a step of counting time in the auxiliary control unit for not receiving a command from the main control unit, a step of making a determination of a timeout when the non-receiving time becomes equal to or longer than the pre-established time period, and a step of deactivating the servo amplifier if a timeout is determined.

Furthermore, the robot control apparatus of the present invention is provided with a robot suspension means for deactivating the servo amplifier, if the main control unit does not return to the auxiliary control unit a signal corresponding to a prior signal that the auxiliary control unit has transmitted to the main control unit. The method of controlling the robot in this process includes a step for the auxiliary control unit to output a signal to the main control unit, a step of receiving a response signal from the main control unit, a step of verifying whether the response signal is a signal corresponding to the transmitted signal, and a step of deactivating the servo amplifier, if the response signal does not correspond to the transmitted signal.

Moreover, the robot control apparatus of the present invention is provided with a timer means in the main control unit, and a determination means also in the main control unit for determining either the auxiliary control unit or the communication means is out of order, if the main control unit does not receive a signal from the auxiliary control unit for a pre-established period of time or longer. The method of controlling the robot in this process includes a step of counting time in the main control unit for not receiving a signal from the auxiliary control unit, a step of making a determination of a timeout when the non-receiving time becomes equal to or longer than the pre-established time period, and a step of determining either the auxiliary control unit or the communication means is out of order if a timeout is determined.

Further, the robot control apparatus of the present invention is provided with a determination means in the main control unit for determining either the auxiliary control unit or the communication means is out of order, if a signal corresponding to the signal transmitted to the auxiliary control unit from the main control unit is not returned from the auxiliary control unit. The method of controlling the robot in this process includes a step for the main control unit to output a signal to the auxiliary control unit, a step of receiving a response signal from the auxiliary control unit, a step of verifying whether the response signal is a signal corresponding to the transmitted signal, and a step of determining either the auxiliary control unit or the communication means is out of order, if the response signal does not correspond to the transmitted signal.

Furthermore, the robot control apparatus of the present invention is provided with a centralized control unit connected to the main control unit via communication means, a timer means in the centralized control unit, and a determination means also in the centralized control unit for determining either the main control unit or the communication means is out of order, if the centralized control unit does not receive a signal from the main control unit for a pre-established period of time or longer. The method of controlling the robot in this process includes a step of counting time in the centralized control unit connected to the main control unit via the communication means for not receiving a signal transmitted from the main control unit, a step of making a determination of a timeout when the non-receiving time becomes equal to or longer than the pre-established time period, and a step of determining either the main control unit or the communication means is out of order if a timeout is determined.

Moreover, the robot control apparatus of the present invention is provided with a centralized control unit connected to the main control unit via the communication means, and a determination means in the centralized control unit for determining that the main control unit or the communication means is out of order, if a signal corresponding to the signal transmitted to the main control unit from the centralized control unit is not returned from the main control unit. The method of controlling the robot in this process includes a step for the centralized control unit connected to the main control unit via the communication means to output a signal to the main control unit, a step of receiving a response signal from the main control unit, a step of verifying whether the response signal is a signal corresponding to the transmitted signal, and a step of determining either the main control unit or the communication means is out of order, if the response signal does not correspond to the transmitted signal.

DESCRIPTION OF THE PREFERRED EMBODIMENTS

A robot control apparatus of the present invention comprises a servo amplifier for controlling a driving source of a robot, an auxiliary control unit for outputting a driving control command to the servo amplifier, and a main control unit having a main control circuit for controlling the robot, for outputting a control command for operating the robot to the auxiliary control unit through communication means, and provided separately from the auxiliary control unit. Accordingly, since the main control unit can be disposed in a location isolated from the servo amplifier, which generates intense heat and electrical noises, and also from a manipulator, which is used under an adverse environment such as high temperatures and dusty particles, it is able to avoid an erroneous operation of the robotic system and from receiving damages due to an influence of the adverse environment.

Further, since the main control unit and the auxiliary control unit are separate from each other, an improvement of operational performance of the robot can be achieved easily by modifying only the main control unit, without subjecting the entire control apparatus to a modification.

In addition, a task of renewing a system program of the robot can be carried out quite easily, since the system program of the robot is stored in a data storage device such as a hard disk, a flash memory, and the like in the main control unit, and the main control unit is disposed in a remote place from the manipulator. Besides, since the teaching data, etc. of the robot are also stored in the data storage device such as the hard disk, the flash memory, and the like in the main control unit, a battery, etc. needs not be used to maintain the data. Moreover, since there is also an auxiliary storage device provided in the main control unit for backup of the data, the task of backing-up the data can be accomplished easily and quickly, thereby enabling it to be prepared for an unforeseeable loss of the data.

Further, there is adopted a general-purpose data bus and a general-purpose interface as a data bus of the main control unit. This can readily allow use of general purpose peripheral devices such as a display device like a monitor, etc., an input device like a keyboard, etc., and a communications device like a network, etc. by connecting them to the robot control apparatus, thereby enabling an expansion of the system freely. In addition, this also makes it possible to concentrically supervise and control a plurality of the robot control apparatuses using communication means such as the network, since the robot control apparatuses can be connected with generic network boards in the case of a system operating a plurality of robots.

Figure 1:
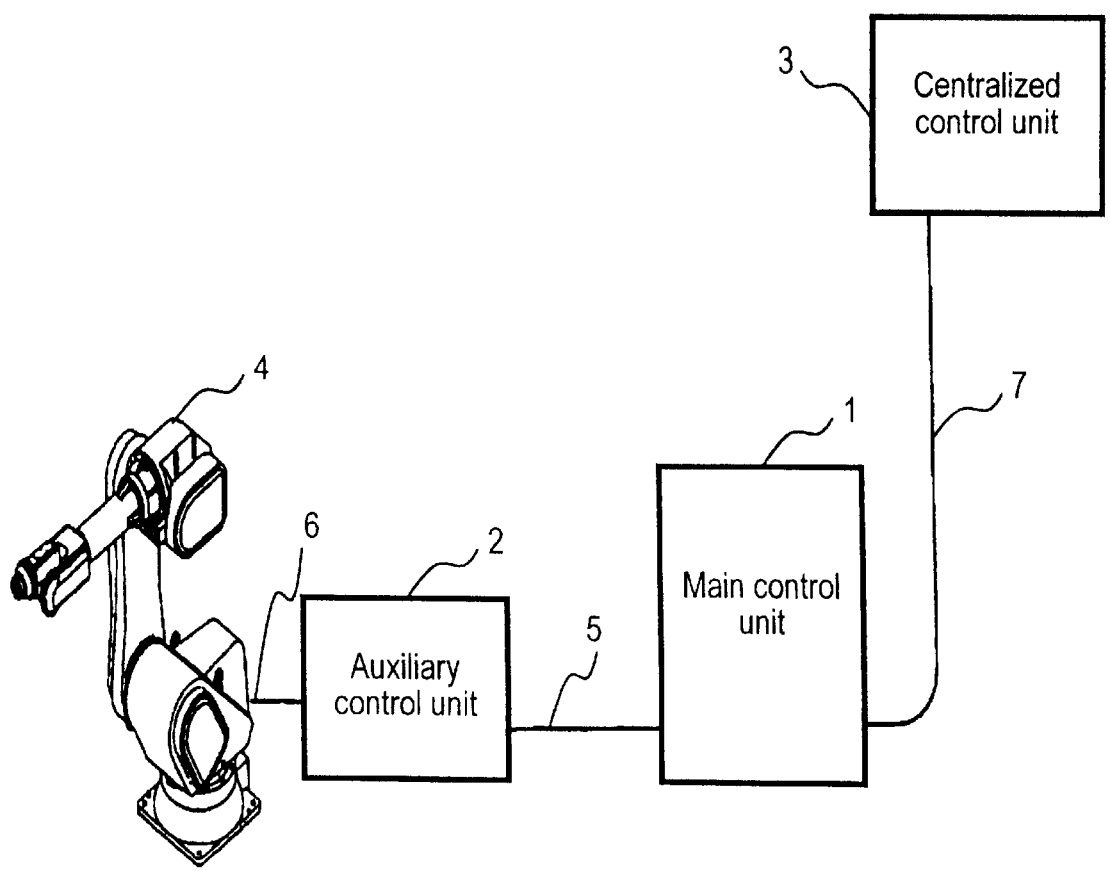
FIG. 1 is a general architectural view of a robot control apparatus of the present invention.

The following will describe an exemplary embodiment of the present invention with reference to the drawings. An overall architecture of the robot control apparatus of this invention is shown in FIG. 1. In this robot control apparatus, a main control unit 1 and an auxiliary control unit 2 control a manipulator 4 actuated by a servo motor. The main control unit 1 and the auxiliary control unit 2 are so composed that they communicate data through a communication means 5. The main control unit 1 is also connected to a centralized control unit 3 through a communication means 7. The centralized control unit 3 concentrically supervises a plurality of the robot control apparatuses connected thereto, and controls them.

Figure 2:
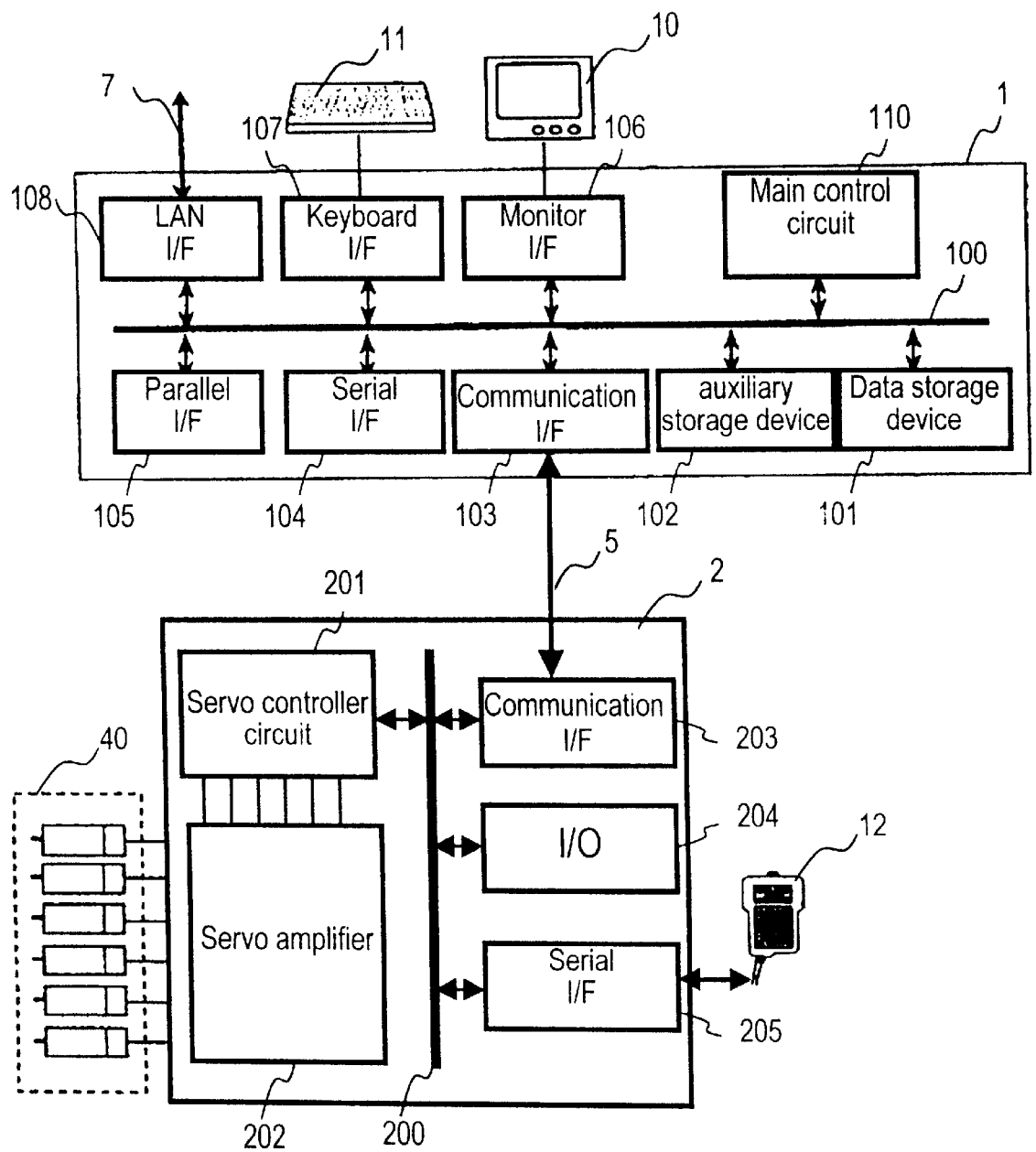
FIG. 2 is a block diagram depicting a structure of a main control unit and an auxiliary control unit of the present invention.

FIG. 2 is a block diagram showing an exemplary structure of the main control unit 1 and the auxiliary control unit 2. The main control unit 1 comprises a main control circuit 110, a data storage device 101, an auxiliary storage device 102, an interface 103 for communication with the auxiliary control unit, an interface 108 for a local area network (LAN), serving as a communication means with the centralized control unit 3, and so on. These are connected to a PCI bus 100, used widely as the general-purpose data bus. In addition, the main control unit is also provided with a serial interface 104 and a parallel interface 105 of the RS-232C type used widely as external interfaces of personal computers, which allows connection and use readily of a variety of peripheral devices. Moreover, there are provided an interface 106 for a monitor and an interface 107 for a keyboard connected to the data bus 100 serving as man-machine interfaces. These interfaces employ the same connectors as used generally for personal computers for a connection between the data bus 100 and each interface, and between each interface and the peripheral device connected thereto, so as to increase an extensibility of the robot control apparatus. Although the PCI bus is employed as the data bus 100 in this exemplary embodiment, an equivalent effect can be achieved even with an ISA bus, which is also used as equally commonly as the PCI bus.

The data storage device 101 consisting of a hard disk drive stores a teaching data, a system data, a system program, and so on for the robot. A CPU in the main control circuit 110 loads necessary data among them into a memory in the main control circuit 110, and computes a position control data, etc. of the robot. The auxiliary storage device 102 consisting similarly of a hard disk drive backs up the data stored in the data storage device 101, to be prepared for an unforeseeable loss of the data. The hard disk drives wherein the data can be kept without a supply of electricity are used for the data storage device 101 and the auxiliary storage device 102. However, their reliability can be further increased by adopting flash memories that are capable of operating under comparatively high temperatures without requiring a mechanical movement. When it becomes necessary to read the data in the data storage device 101 and the auxiliary storage device 102, or to renew the data from the outside, they can be accomplished remotely from the centralized control unit through the LAN interface 108. Alternatively, it can be accomplished through a floppy disk by connecting a floppy disk drive or the like to the data bus 100, although not shown in the figure. It is needless to note that the foregoing structure can be realized more easily with a personal computer as the main control unit.

On the other hand, the auxiliary control unit 2 comprises a communication interface 203 for connecting to a data bus 200, a servo controller circuit 201, a servo amplifier 202, an I/O interface 204, and a serial interface 205. The data bus is able to make a data communication with the main control unit 1 through the communication interface 203 and communication means 5 comprising an RS-232C type serial communication cable. The I/O interface 204 is connected with an end effector such as a robot hand, though not shown in the figure, and the serial interface 205 is connected with a teaching device 12 for executing a task of teaching for the robot.

Figure 3:
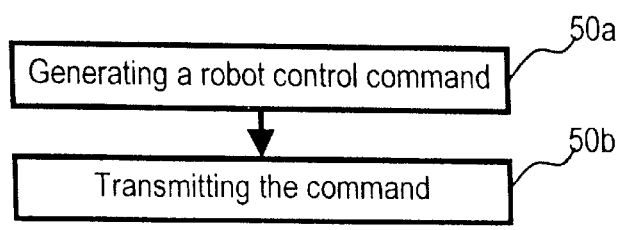
FIG. 3 is a flow chart depicting a method of the present invention for controlling a robot.
Figure 4:
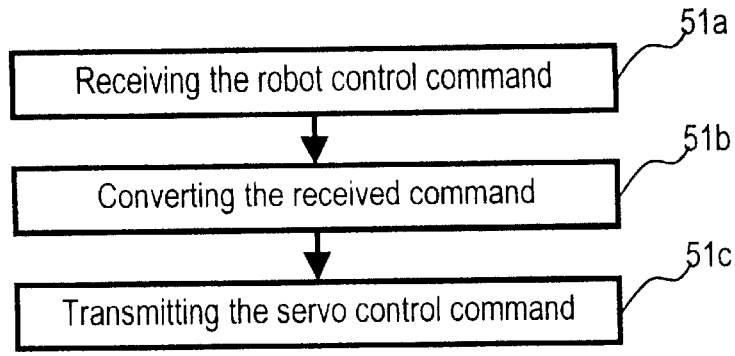
FIG. 4 is another flow chart depicting a method of the present invention for controlling a robot.

The main control circuit 110 of the main control unit 1 controls the auxiliary control unit with a step 50a of generating a robot control command and a step 50b of transmitting the command to the servo controller circuit 201 in the auxiliary control unit 2, as shown in FIG. 3. The servo controller circuit 201 in the auxiliary control unit 2 controls the servo amplifier 202 with a step 51a of receiving the robot control command from the main control unit 1, a step 51b of converting the received command into another command for controlling the servo amplifier, and a step 51b of transmitting the servo control command to the servo amplifier, as shown in FIG. 4. The servo controller circuit 201 controls a servomotor 40 connected the servo amplifier 202. The main control unit 1 transmits to the auxiliary control unit 2 the robot control command such as a positional command of the robot, an ON/OFF command for the servo amplifier, and a temporary suspension and restart, etc.

Figure 5:
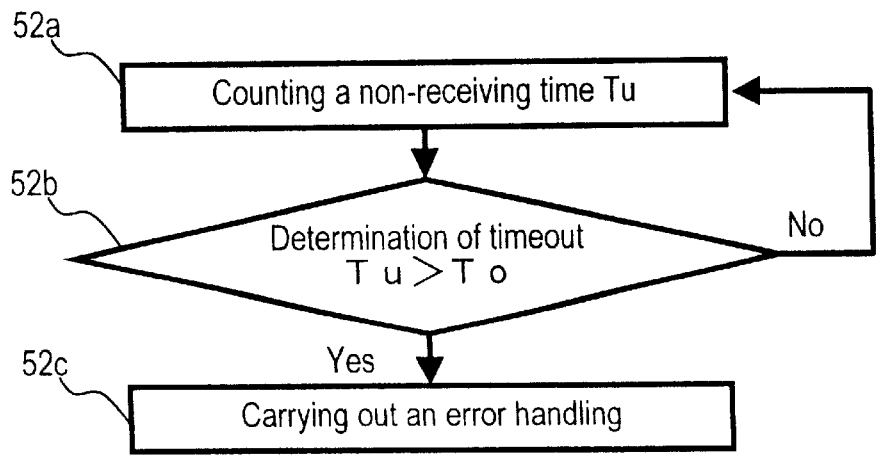
FIG. 5 is still another flow chart depicting a method of the present invention for controlling a robot.

The auxiliary control unit 2 is provided with a robot suspending means for deactivating the servo amplifier 202, using a method of controlling the robot, which comprises a step 52a of counting a non-receiving time Tu of the robot control command to be transmitted by the main control unit with a timer means, not shown in the figure, a step 52b of making a determination as to whether the Tu is equal to or longer than a pre-established determination time period To (a timeout), and a step 52c of carrying out an error handling, if a determination of timeout is made, as shown in FIG. 5.

Figure 6:
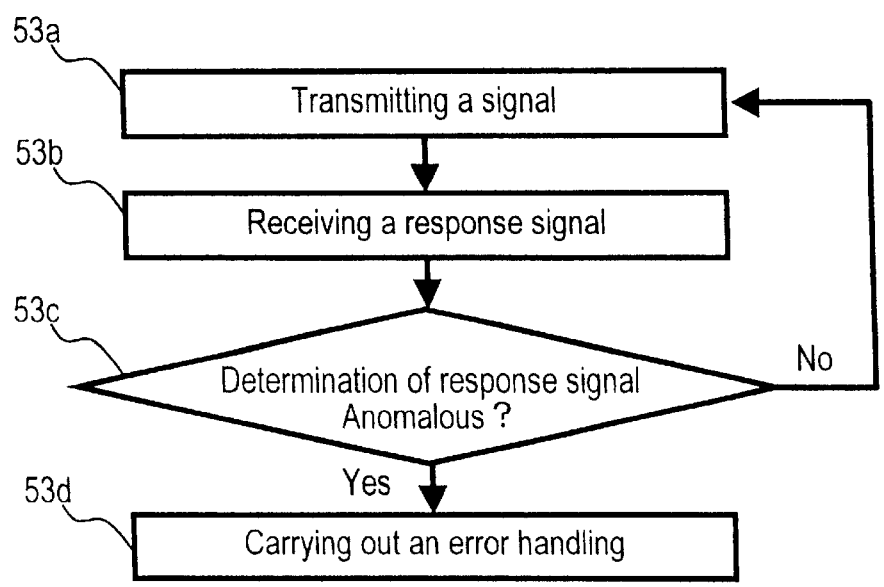
FIG. 6 is yet another flow chart depicting a method of the present invention for controlling a robot.
Figure 7:
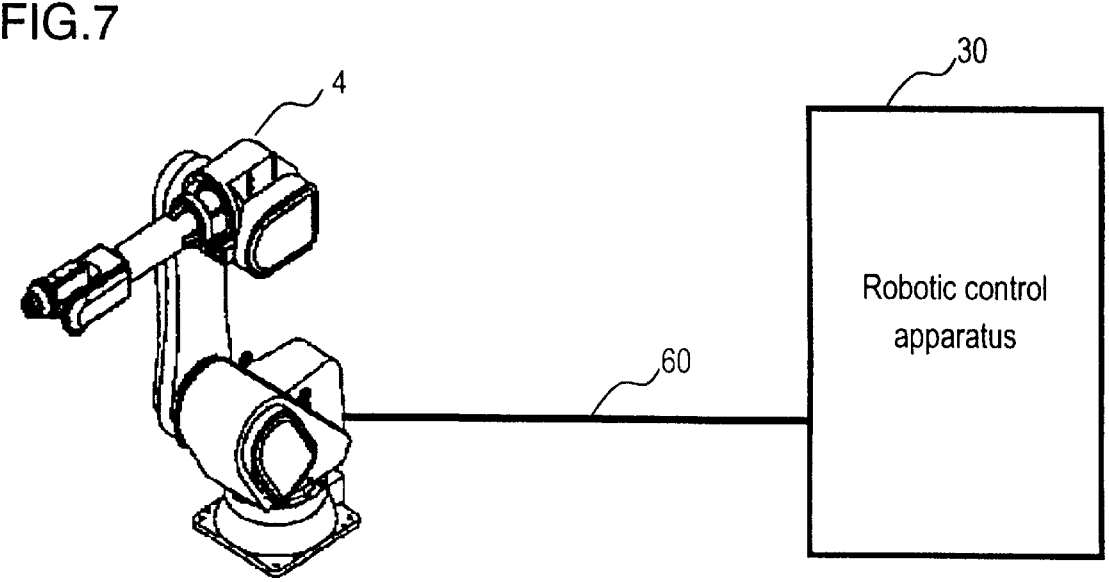
FIG. 7 is a general architectural view of a robotic system of the prior art.
Figure 8:
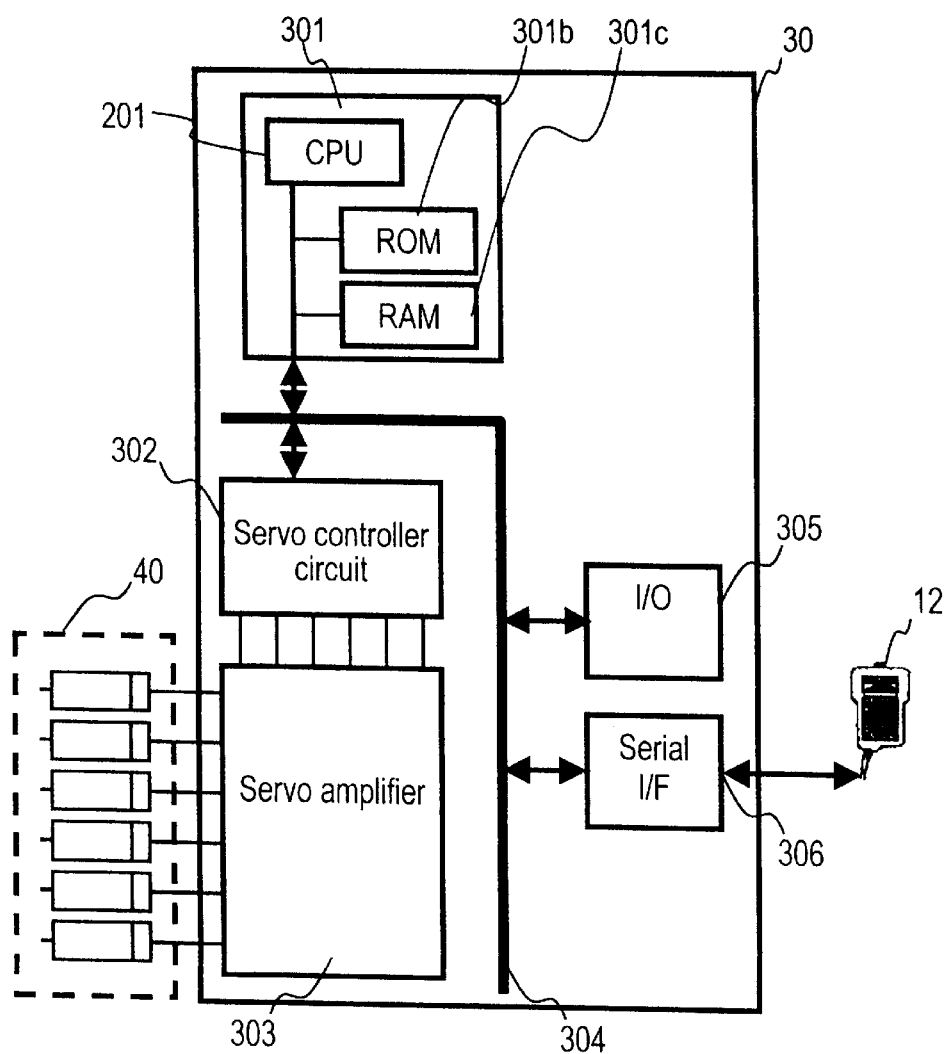
FIG. 8 is a block diagram depicting a structure of a robot control apparatus of the prior art.

The auxiliary control unit 2 is also provided with another robot suspending means for deactivating the servo amplifier 202, in case of making an error handling, using a method of controlling the robot, which comprises a step 53a of transmitting a signal from the auxiliary control unit 2 to the main control unit 1, a step 53b of receiving a response signal returned from the main control unit 1 to the auxiliary control unit 2, a step 53c of verifying whether the response signal is a signal corresponding to the transmitted signal, and a step 53d of carrying out the error handling, if the response signal is anomalous, as shown in FIG. 6.

On the other hand, the main control unit 1 is provided with a determination means for determining either the auxiliary control unit 2 or the communication means is out of order, if an error determination is made, by adopting a method of controlling the robot, which comprises a step 52a of counting a non-receiving time Tu of the response signal to be transmitted by the main control unit with a timer means provided in the main control unit 1, though not shown in the figure, a step 52b of making a determination as to whether the Tu is equal to or longer than a pre-established determination time period To (a timeout), and a step 52c of carrying out an error handling, if a determination of timeout is made, as shown in FIG. 5.

Also, the main control unit 1 is provided with another determination means for determining either the auxiliary control unit 2 or the communication means 5 is out of order, if an error determination is made, by adopting a method of controlling the robot, which comprises a step 53a of transmitting a signal from the main control unit 1 to the auxiliary control unit 2, a step 53b of receiving a response signal returned from the auxiliary control unit 2 to the main control unit 1, a step 53c of verifying whether the response signal is a signal corresponding to the transmitted signal, and a step of carrying out the error handling, if the response signal is anomalous, as shown in FIG. 6.

Furthermore, the robot control system of the present invention is provided with a centralized control unit 3 connected to the main control unit 1 via a communication means 7 using a LAN, and the centralized control unit 3 is provided with a timer means which is not shown in the figure. The centralized control unit 3 is provided further with a determination means for determining either the main control unit or the communication means is out of order, if an error determination is made, by adopting a method of controlling the robot, which comprises a step 52a of counting a non-receiving time Tu of the robot control command to be transmitted by the main control unit, a step 52b of making a determination as to whether the Tu is equal to or longer than a pre-established determination time period To (a timeout), and a step 52c of carrying out an error handling, if a determination of timeout is made, as shown in FIG. 5.

The centralized control unit 3 is provided with another determination means for determining either the main control unit 1 or the communication means 7 is out of order, if an error determination is made, by adopting a method of controlling the robot, which comprises a step 53a of transmitting a signal from the centralized control unit 3 to the main control unit 1, a step 53b of receiving a response signal returned from the a main control unit 1 to the centralized control unit 3, a step 53c of verifying whether the response signal is a signal corresponding to the transmitted signal, and a step 53d of carrying out an error handling, if the response signal is anomalous, as shown in FIG. 6.

An RS-422 type serial cable, and optical communication means using an optical communication cable or the infrared rays may be used as the above-described communication means 5 and 7, instead of the communication means using the RS-232C type and LAN, in order to obtain the similar effectiveness. An optical communication cable can be adopted as a very effectual means especially in an environment where electrical noises are considerably high.

INDUSTRIAL APPLICABILITY

In the present invention, as has been described above, since a main control unit can be disposed in a manner to be isolated from a servo amplifier, which generates heat and electrical noises, and also from a manipulator used under an adverse environment such as high temperatures and dusty particles, it is able to avoid an erroneous operation of a robotic system and from receiving damages due to an influence of the adverse environment. In addition, an improvement of operational performance of the robot can be attained easily by modifying only the main control unit.

In addition, a task of renewing a system program of the robot can be made quite readily, since the system program of the robot is stored in a data storage device such as a hard disk, a flash memory, and the like in the main control unit, and the main control unit is disposed in a remote place from the manipulator. Besides, since the teaching data, etc. of the robot are also stored in the data storage device such as the hard disk, the flash memory, and the like in the main control unit, a battery, etc. need not be used to maintain the data. Furthermore, since there is also an auxiliary storage device provided in the main control unit for backup of the data, the task of backing-up the data can be accomplished easily and quickly, thereby enabling it to be prepared for an unforeseeable loss of the data.

Moreover, there is adopted a general-purpose data bus and a general-purpose interface for the data bus of the main control unit. This can allow use of general purpose peripheral devices such as a display device like a monitor, etc., an input device like a keyboard, etc., and a communications device like a network, etc. easily by connecting them to the robot control apparatus, thereby enabling an expansion of the system freely. In addition, since the robot control apparatuses are connectable with generic network boards, this makes it possible to concentrically supervise and control a plurality of the robot control apparatuses using communication means such as the network, in the case of a system operating a plurality of robots.

What is claimed is:

1. A control apparatus for a robot having a driving source, comprising:
   a servo amplifier for controlling said driving source of said robot;
   an auxiliary control unit for outputting a driving control command to said servo amplifier;
   a communication means; and
   a main control unit for outputting a control command for, operation of said robot to said auxiliary control unit through said communication means, said main control unit being physically separatable from said auxiliary control unit, thereby said main control unit is not affected by an adverse environment of said auxiliary control unit;
   wherein said auxiliary control unit is provided with a timer means, and a robot suspension means for deactivating said servo amplifier if said auxiliary control unit does not receive a robot control command from said main control unit for a pre-established period of time or longer.

2. A control apparatus for a robot having a driving source, comprising:
   a servo amplifier for controlling said driving source of said robot;
   an auxiliary control unit for outputting a driving control command to said servo amplifier;
   a communication means; and
   main control unit for outputting a control command for operation of said robot to said auxiliary control unit through said communication means, said main control unit being physically separatable from said auxiliary control unit, thereby said main control unit is not affected by an adverse environment of said auxiliary control unit; and
   a robot suspension means in said auxiliary control unit, wherein said auxiliary control unit transmits a signal to said main control unit, and said robot suspension means deactivates said servo amplifier if said main control unit does not return to said auxiliary control unit another signal corresponding to said signal.

3. A control apparatus for a robot having a driving source, comprising:
   a servo amplifier for controlling said driving source of said robot;
   an auxiliary control unit for outputting a driving control command to said servo amplifier;
   a communication means; and
   a main control unit for outputting a control command for operation of said robot to said auxiliary control unit through said communication means, said main control unit being physically separatable from said auxiliary control unit, thereby said main control unit is not affected by an adverse environment of said auxiliary control unit;
   wherein said main control unit is provided with a timer means, and a determination means for determining either said auxiliary control unit or said communication means is out of order, if said main control unit does not receive a signal from said auxiliary control unit for a pre-established period of time or longer.

4. A control apparatus for a robot having a driving source, comprising
   a servo amplifier for controlling said driving source of said robot;
   an auxiliary control unit for outputting a driving control command to said servo amplifier;
   a communication means; and
   a main control unit for outputting a control command for operation of said robot to said auxiliary control unit through said communication means, said main control unit being physically separatable from said auxiliary control unit, thereby said main control unit is not affected by an adverse environment of said auxiliary control unit;
   wherein said main control unit is provided with a determination means for determining either said auxiliary control unit or said communication means is out of order, if a signal corresponding to another signal transmitted to said auxiliary control unit from said main control unit is not returned from said auxiliary control unit.

5. A control apparatus for a robot having a driving source, comprising:
   a servo amplifier for controlling said driving source of said robot;
   an auxiliary control unit for outputting a driving control command to said servo amplifier;
   a communication means;
   a main control unit for outputting a control command for operation of said robot to said auxiliary control unit through said communication means, said main control unit being physically separatable from said auxiliary control unit, thereby said main control unit is not affected by an adverse environment of said auxiliary control unit; and
   a centralized control unit connected to said main control unit via communication means, wherein said centralized control unit is provided with a timer means, and a determination means for determining either said main control unit or said communication means is out of order, if said centralized control unit does not receive a signal from said main control unit for a predetermined period of time or longer.

6. A control apparatus for a robot having a driving source, comprising:
   a servo amplifier for controlling said driving source of said robot;
   an auxiliary control unit for outputting a driving control command to said servo amplifier;
   a communication means;
   a main control unit for outputting a control command for operation of said robot to said auxiliary control unit through said communication means, said main control unit being physically separatable from said auxiliary control unit, thereby said main control unit is not affected by an adverse environment of said auxiliary control unit; and
   a centralized control unit connected to said main control unit via communication means, wherein said centralized control unit is provided with a determination means for determining that said main control unit or the communication means is out of order, if a signal corresponding to another signal transmitted to said main control unit from said centralized control unit is not returned from said main control unit.

7. The robot control apparatus according to claim 5, wherein said centralized control unit comprises a computer.

8. A method of controlling a robot comprising, in an auxiliary control unit, the steps of:

receiving a robot control command from a main control unit;

converting said command into another command to be transmitted to a servo amplifier;

transmitting said converted command to said servo amplifier, with said main control unit being physically separatable from said auxiliary control unit so that said main control unit is not affected by an adverse environment of said auxiliary control unit;

counting in said auxiliary control unit a non-receiving time of a command from said main control unit;

making a determination of a timeout when said non-receiving time becomes equal to or longer than a pre-established period of time; and deactivating said servo amplifier if a timeout is determined.

9. A method of controlling a robot comprising, in an auxiliary control unit, the steps of:

receiving a robot control command from a main control unit;

converting said command into another command to be transmitted to a servo amplifier;

transmitting said converted command to said servo amplifier, with said main control unit being physically separatable from said auxiliary control unit so that said main control unit is not affected by an adverse environment of said auxiliary control unit;

outputting a signal from said auxiliary control unit to said main control unit;

receiving a response signal from said main control unit;

verifying whether the response signal is a signal corresponding to the transmitted signal; and deactivating said servo amplifier, if the response signal does not correspond to the transmitted signal.

10. A method of controlling a robot comprising, in a main control unit, the steps of:

generating a robot control command;

outputting said robot control command to an auxiliary control unit through a communication means, with said main control unit being physically separatable from said auxiliary control unit so that said main control unit is not affected by an adverse environment of said auxiliary control unit;

counting in said main control unit a non-receiving time of a signal from said auxiliary control unit; making a determination of a timeout when said non-receiving time becomes equal to or longer than a pre-established period of time; and determining either said auxiliary control unit or said communication means is out of order if a timeout is determined.

11. A method of controlling a robot comprising, in a main control unit, the steps of:

generating a robot control command;

outputting said robot control command to an auxiliary control unit through a communication means, with said main control unit being physically separatable from said auxiliary control unit so that said main control unit is not affected by an adverse environment of said auxiliary control unit;

outputting a signal from said main control unit to said auxiliary control unit; receiving a response signal from said auxiliary control unit; verifying whether the response signal is a signal corresponding to the transmitted signal; and determining either said auxiliary control unit or said communication means is out of order, if the response signal does not correspond to the transmitted signal.

12. A method of controlling a robot comprising, in a main control unit, the steps of:

generating a robot control command;

outputting said robot control command to an auxiliary control unit through a communication means, with said main control unit being physically separatable from said auxiliary control unit so that said main control unit is not affected by an adverse environment of said auxiliary control unit;

counting in a centralized control unit connected to said main control unit via communication means a non-receiving time of a signal from said main control unit; making a determination of a timeout when said non-receiving time becomes equal to or longer than a pre-established period of time; and determining either said main control unit or said communication means is out of order if a timeout is determined.

13. A method of controlling a robot comprising, in a main control unit, the steps of:

generating a robot control command;

outputting said robot control command to an auxiliary control unit through a communication means, with said main control unit being physically separatable from said auxiliary control unit so that said main control unit is not affected by an adverse environment of said auxiliary control unit;

outputting to said main control unit a signal from a centralized control unit connected to said main control unit via communication means; receiving a response signal from said main control unit; verifying whether the response signal is a signal corresponding to the transmitted signal; and determining either said main control unit or said communication means is out of order, if the response signal does not correspond to the transmitted signal.

* * * * *